United States Patent [19]

Bendert et al.

[11] Patent Number: 5,761,678

[45] Date of Patent: Jun. 2, 1998

[54] CREATION OF CLONE STORAGE AREA WITH IDENTIFICATION OF BASE STORAGE AREA AND DEFERRED CLONING OF METADATA

[75] Inventors: Edward Joseph Bendert, Vestal; Robert Bradley Bennett, Endwell, both of N.Y.; Eugene Johnson, Austin, Tex.; Robert Michael Nugent, Nichols; James Michael Showalter, Endicott, both of N.Y.

[73] Assignee: International Business Machines Corporation, Armonk, N.Y.

[21] Appl. No.: 670,883

[22] Filed: Jun. 26, 1996

[51] Int. Cl.[6] .................................................. G06F 17/40
[52] U.S. Cl. ..................... 707/204; 707/200; 707/201; 707/203; 711/112; 711/117; 711/162
[58] Field of Search ....................... 707/201, 202, 707/203, 204, 200; 711/162, 112, 117

[56] References Cited

U.S. PATENT DOCUMENTS

| 5,061,919 | 10/1991 | Watkins | 340/721 |
|---|---|---|---|
| 5,133,068 | 7/1992 | Crus et al. | 395/600 |
| 5,175,849 | 12/1992 | Schneider | 395/600 |
| 5,251,315 | 10/1993 | Wang | 395/600 |
| 5,276,860 | 1/1994 | Fortier et al. | 395/575 |
| 5,287,496 | 2/1994 | Chen et al. | 395/600 |
| 5,321,807 | 6/1994 | Mumford | 395/162 |
| 5,333,315 | 7/1994 | Saether et al. | 395/600 |
| 5,339,134 | 8/1994 | Nakamura et al. | 355/202 |
| 5,339,392 | 8/1994 | Risberg et al. | 395/161 |
| 5,379,419 | 1/1995 | Heffernan et al. | 395/600 |
| 5,410,667 | 4/1995 | Belsan et al. | 395/425 |
| 5,437,026 | 7/1995 | Borman et al. | 395/600 |
| 5,479,654 | 12/1995 | Squibb | 395/600 |
| 5,586,326 | 12/1996 | Ryu et al. | 395/701 |
| 5,632,027 | 5/1997 | Martin et al. | 395/497.01 |
| 5,644,766 | 7/1997 | Coy et al. | 395/620 |
| 5,675,802 | 10/1997 | Allen et al. | 395/703 |
| 5,684,991 | 11/1997 | Malcolm | 395/620 |

OTHER PUBLICATIONS

IBM Technical Disclosure Bulletin vol. 38 No. 6 Jun. 1995 pp. 485–487. .Rebuild Only Used Space In Update–In–Place Disk Array. by Mattson et al.

*Primary Examiner*—Thomas G. Black
*Assistant Examiner*—Jean R. Homere
*Attorney, Agent, or Firm*—Arthur J. Samodovitz

[57] ABSTRACT

A system and method efficiently manage clones of an object group. A base storage area contains metadata for each of multiple objects in the object group. The metadata for each object identifies data within each object. The system receives a request to clone a base storage area, and in response, the system creates a clone storage area containing an identification of the base storage area but not the metadata. If there is a subsequent request to update a portion of one of the objects, then the system copies the portion, copies the metadata into the clone storage area for the one object, makes the update to the object copy and changes the metadata in the base storage area to identify the portion copy instead of the original portion. If there is no subsequent request to update any of the multiplicity of objects, then the system does not copy the metadata for any of the multiplicity of objects into the clone storage area.

16 Claims, 8 Drawing Sheets

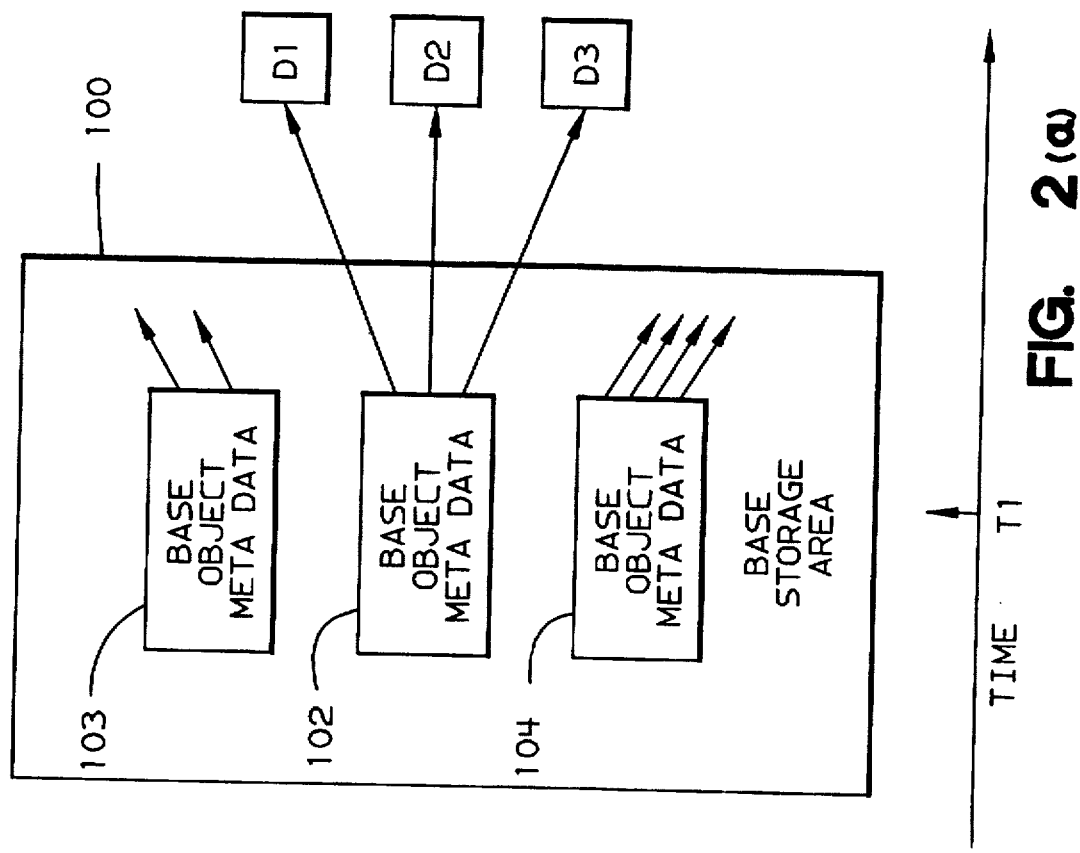

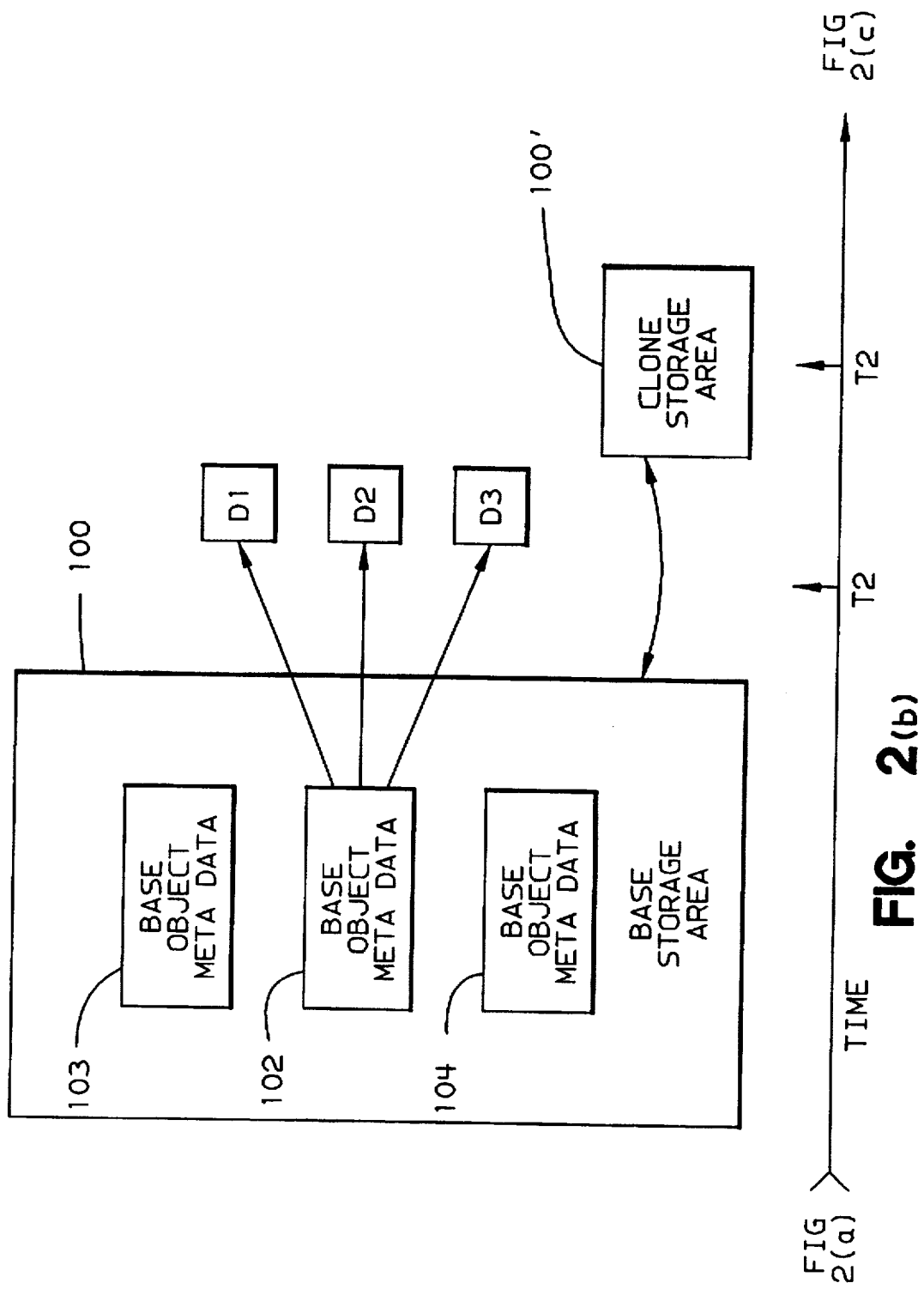

CREATION OF CLONE STORAGE AREA WITH IDENTIFICATION OF BASE STORAGE AREA AND DEFERRED CLONING OF METADATA

BACKGROUND OF THE INVENTION

The invention relates generally to computer systems and deals more particularly with an operating system which minimizes the amount of data that must be copied to support a request to clone a group of objects.

A computer system typically stores objects such as files, and there may be thousands of files used by a computer. A file comprises actual data and "metadata". "Metadata" is control information for the file such as file size and type and pointers to the actual data. The files are often stored on a disk (also called DASD), and may be shared by more than one user.

There are many types of computer systems known today. A personal computer may be operated independently of other computers. In such an environment, the computer receives file requests from applications executing in the computer or a human operator via a keyboard or graphical user interface. A single file may be shared by more than one application or human operator or a combination of applications and human operators.

A "virtual machine" computer system was also known. A "virtual machine" is a logical division of a computer to divide processor time, memory and other, real computer resources amongst the virtual machines. Each virtual machine appears to the user to be a real machine dedicated to the user and can execute user applications (although there may be some apparent delays in responding to user requests when the real processor is occupied with requests from other virtual machines). In the case of the virtual machine environment, the virtual machine receives file requests from applications executing in the same or different virtual machine or from a human operation via a keyboard or graphical user interface. The VM/ESA (™) virtual machine operating system from International Business Machines Corporation includes a Shared File System. The Shared File System permits multiple applications and human operators to share the same file.

Rules in the IBM VM/ESA Shared File System allow multiple users to read a file that is being updated concurrently by a single writer. Each reader that opens the file sees the last committed level of the file. For each block (4096 bytes) of data that is effected by the writer, the Shared File System actually performs the update in a copy (called a "shadow") of the block. A concurrent reader does not see the updated block, but continues to read the original block. Only the blocks that are updated are shadowed. The original blocks are maintained until there are no readers at that level, at which time the original blocks are deleted.

Client/server computer systems were also known, and typically involve a multiplicity of clients in the form of workstations and associated applications, a server in the form of a workstation or main frame computer and a network in the form of wiring, hardware and software to interconnect the clients to the server. In response to requests from the clients, the server provides a variety of services such as storage and management of large files for each client and storage and management of a single file shared by more than one client.

Open Software Foundation's Distributed File Service (DFS) provides shared file management in a client/server environment. The Distributed File Service permits the shared files to reside on the same or different system platforms as that of the users and be supported by the same or different operating system as that of the users. The file has a system-wide identifier, and the location of the file is transparent to the user.

"Cloning" is a process of making a copy of a group of files (called a fileset) at a point in time to preserve the state of the fileset at that time. A fileset is a hierarchical group of files that can be mounted in a DFS namespace. There are many uses for clones. For example, an administrator can request that a clone of a user's fileset be created every evening so that each day, the user can access a copy of yesterday's version of the user's files. This is useful if the user accidentally erases one of the user's files, in which case the user can copy yesterday's version of the file back into the user's active fileset without involving an administrator.

In the Distributed File Service, when a request is made to clone a fileset, the system makes a copy of the metadata (including the pointers to the data blocks), but does not make a copy of the data blocks. This saves memory and processor time. After the clone is made, there are two filesets (the original fileset and its clone) whose metadata data block pointers point to the same data blocks. The data block pointers of the original fileset have a special bit (called "copy on write" (COW) bit) that indicates that a new data block should be allocated if the data block is updated. This ensures that the clone fileset (that is, a read-only version of the fileset) continues to see the data that existed when the clone was created despite updates to the original fileset. In the Distributed File Service, if a subsequent request is made to make another clone of the original fileset while the first clone is still present, the system deletes the first clone and proceeds to make the second clone to reflect the state of the original fileset when the second clone request was made. While the Distributed File Service limits the amount of memory and processor time required to support the clone request, further savings are desirable.

A general object of the present invention is to provide a system and process which minimize the amount of data and metadata that are copied during clone requests.

Another object of the present invention is to provide a system and process of the foregoing type which allow multiple clones to be distinguished.

SUMMARY OF THE INVENTION

The invention resides in a system and method for managing clones of an object group. A base storage area contains metadata for each of multiple objects in the object group. The metadata for each object identifies data within each object. The system receives a request to clone a base storage area, and in response, the system creates a clone storage area containing an identification of the base storage area but not the metadata. If there is a subsequent request to update a portion of one of the objects, then the system copies the portion, copies the metadata into the clone storage area for the one object, makes the update to the object copy and changes the metadata in the base storage area to identify the portion copy instead of the original portion. If there is no subsequent request to update any of the multiplicity of objects, then the system does not copy the metadata for any of the multiplicity of objects into the clone storage area.

If a subsequent request is made to make another clone of the original base storage area while the first clone storage area is still present, the system creates another clone storage area containing an identification of the base storage area but not the metadata. If there is another request to update an object in the base storage area, this other clone storage area will reflect the state of the base storage area when the second clone storage area request was made. The first clone storage area, the second clone storage area and the updated base storage area will all exist simultaneously, and only minimal information is copied to support both clone requests.

DETAILED DESCRIPTION OF THE PREFERRED EMBODIMENTS

Figure 1:
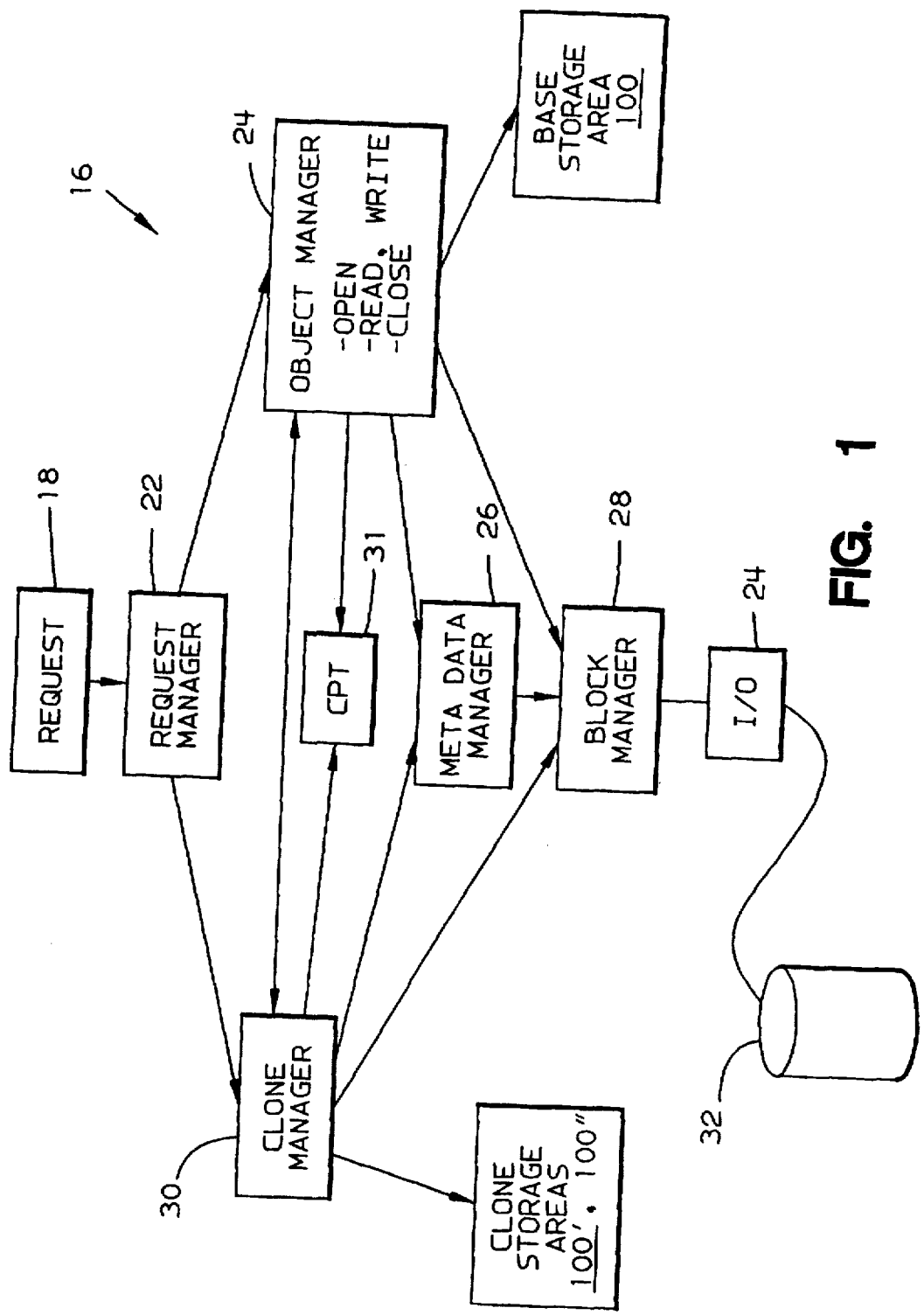
FIG. 1 is a block diagram of a computer system according to the present invention for managing requests to clone a group of objects and open, read, write and close objects within the group.

Referring now to the drawings in detail wherein like reference numbers indicate like elements throughout, FIG. 1 illustrates a computer system generally designated 16 according to the present invention. Computer system 16 can be a stand-alone computer, a virtual machine or a server in a client/server environment such as Distributed File Service environment. In the stand-alone computer environment, the computer receives work requests from applications executing in the computer or a human operator via a keyboard or graphical user interface. In the case of the virtual machine environment, the virtual machine receives work requests from applications executing in the same or different virtual machine or from a human operation via a keyboard or graphical user interface. In the client/server environment, the server receives requests from client workstations. A request in any of these computer environments is illustrated generally as 18.

Computer system 16 provides a variety of services to the requesters, such as storage and management of objects such as files shared by more than one user process. An "object" typically comprises actual data and metadata (but may contain only metadata before the actual data is written). Computer system 16 comprises a request manager 22 for administrative handling and routing of requests 18, an object manager 24 for reading and writing objects such as files, and a clone manager 30 for processing clone requests. System 16 also comprises a metadata manager 26 for storing and retrieving metadata to support the object manager 24 and clone manager 30. Computer system 16 also comprises a block manager 28 for storing and retrieving blocks of actual data and metadata to support the object manager 24, metadata manager 26 and clone manager 30. Block manager 28 is coupled by I/O hardware 29 to DASD 32 containing actual data, metadata, base storage areas and clone storage areas described below.

Object manager 24 also maintains a storage area (called "fileset" in Distributed File System nomenclature). A storage area is either a base storage area (base fileset) or a clone storage area (clone fileset). The storage area contains:

1) metadata information about the storage area itself;
2) metadata for each object represented by the storage area; and
3) a "CPT" table 31 listing block numbers which have been copied pursuant to an update request when the base storage area is subject to an outstanding clone request. A "CPT" table only applies to a base storage area.

The storage area information, metadata and CPT table are as follows.

Storage Area Information

A storage area can be a base storage area or a clone storage area. A base storage area contains the metadata and data for all objects represented by the base storage area. The metadata and data in the base storage area reflect the most recent updates.

A clone storage area is used to preserve the base storage area object metadata and data that existed at the time the clone storage area was created, even if the base area object metadata or data is updated after the clone is created. The clone storage area contains an identification of the base storage area and metadata for objects which have been updated since the clone was created. The metadata in the clone storage area points to objects in their state when the clone request was made. When a clone is created for a base storage area, only the information about the existence of clone storage area itself need be defined at clone creation. Object metadata and object data is not recorded in the clone storage area until an actual base storage area object update occurs.

A. Storage area information includes:

A1 Storage Area (or file set) ID

A2 Storage Area (or file set) Name

A3 Base Storage Area ID
 This field is 0 if this area is the base storage area. If this a clone storage area, this field contains the Base Storage Area ID to which the clone corresponds.

A4 Clone Count (for a base storage area). This field is 0 if this storage area represents a clone storage area. If this storage area represents a base storage area, this field is equal to the number of clones of this base storage area.

A5 Erase Flag

A6 DTC—date and time of creation of this storage area (whether base or clone).

B. Object Metadata (separate metadata for each object of storage area)

B1 Object ID

B2 Storage Area ID (ID of storage area—base or clone, which references this object)

B3 Base Storage Area ID (ID of base storage area of the object metadata for a cloned object)

B4 Clone Count (if this is a base storage area, the clone count is the number of clones for this object. The clone count can be less than the number of clones of the base storage area.)

B5 PBN List (list of block numbers for data blocks which comprise the object—for file type objects)

B6 Erase Flag

B7 DTC—date and time of creation of this object

B8 DTLU—date and time of last update to object

B9 Other Data—for example: —type of object: (file, directory), and —size of object, etc.

C. Copied PBNs Table (CPT):

A list of storage area block identifiers (PBNs) that identify blocks of data in objects in the base storage area that were changed after the base storage area was last cloned. This PBN list is used to determine whether a copy of the base storage area block is already available for update. There is only one CPT area for a base storage area. It is common to a base storage area and all of the clone storage areas of the base storage area. If a block is identified in the CPT, it indicates that no clones were created since the block was last updated. A block identified in the CPT is associated with the base storage area, does not apply to any clone storage areas, and can be updated without any other cloning considerations.

If a base storage area block is updated after a clone is created and the block is in the CPT for the base storage area, the block is updated without further clone considerations since the block does not apply to any of the outstanding clones. (It is also possible to implement the present invention without the CPT, although the performance will not be as good. If a CPT is not provided for a base storage area, and at least one clone storage area exists for the base storage area, a block update for an object requires a search of all clone storage areas created after the object was last updated to determine if the object metadata is in all clone storage areas, and if so, if the object metadata in these clone storage areas contains the base storage area PBN being updated. If the metadata for the object being updated exists in all clone storage areas created after the object being updated was last updated, and, if the PBN being updated is not in any of these clone storage areas, the base storage area block can be updated. Otherwise, the PBN being updated must be treated as if it were not in the CPT for the base storage area as described below.)

If a base storage area block is updated after a clone is created and the block is not in the CPT for the base storage area, the block identifier is associated with the clone, a new block is allocated, data from the block is copied to a new block, the new block is updated, the new block is associated with the base storage area object metadata, and the new block is added to the CPT.

If the last clone that references the block is deleted and the block is referenced by base storage area object metadata, the block is added to the CPT. All blocks in the CPT are logically removed from the CPT when a clone is created for the associated base storage area.

Clone manager 30 maintains the clone storage areas and functions according to the present invention to minimize the amount of work required pursuant to a clone request. The following is a description of the functions of object manager 24 and clone manager 30 with reference to FIGS. 2(a–g).

FIG. 2(a) illustrates a base storage area 100 for multiple objects (such as files) 102–104. Each of the objects comprises actual data and metadata. In the illustrated example, object 102 comprises actual data in blocks D1, D2 and D3 located outside the base storage area 100. (The data blocks of objects 103 and 104 are not shown.) As noted above, the metadata for each object is stored in the base storage area 100 and includes the name of the object and numbers/addresses ("PBNs") of the data blocks contained in the object. However, if desired, the data can be structured and identified differently.

FIG. 2(b) illustrates the result of processing a client request to clone base storage area 100. In response to this request, clone manager 30 creates a new clone storage area 100' by obtaining a storage allocation and storing in clone storage area 100' the same "area information" as in the base storage area 100 except as follows. The clone count (A4) for the base storage area is incremented, whereas the clone count for the clone storage area is zero. The date/time of creation (A6) of the clone storage area is the current time, whereas the date/time of creation of the base storage area is older. The Base Storage Area ID (A3) for the clone storage area 100' identifies the base storage area 100, i.e. is the same as the Storage Area ID (A1) of the base storage area. (As a possible optimization, one or more clones can be associated with a base storage area by a chained list of clones to expedite subsequent identification of the clone storage area.) The Base Storage Area ID (A3) of the base Storage Area is zero. The CPT is not copied to the clone storage area 100' pursuant to the clone request. All current CPT entries are logically removed at this time by updating CPT control information such as entry count or length to indicate that there are no entries. Moreover, it should be noted that metadata for objects in the base storage area 100 is NOT copied to clone storage area 100' pursuant to the clone request.

Also as described in more detail below, the metadata will not be copied to the clone storage area 100' for any object in the base storage area which is not updated and is not copied until the request is made to update the object. This usually represents a considerable savings in processor time and storage resources. The existence of a clone storage area is an indicator that at least a view of the base storage area must be maintained as of the time the clone request was made. If changes are subsequently requested to a data block within an object within the base storage area, then and only then is metadata copied to the clone storage area and the copied metadata is limited to that for the changed object. But, until such a change is requested, the clone storage area remains just an indicator requiring little overhead to produce and maintain. (Alternately, pursuant to the request to update object 102, the base storage area 100 could retain the metadata to point to the original blocks of object 102 and clone storage area 100' written with the metadata to point to the copy of the blocks of object 102.)

When opening a file, an application program identifies the name of the storage area and the name of the object within the storage area that it wants to access (open). The object manager 24 examines the storage areas 100 or 100'. If the Base Storage Area ID (A3) is 0, i.e. the object belongs to base storage area 100 and not clone storage area 100'; the object manager locates and uses the metadata 102, 103 or 104 from the base storage area 100 unless the Erase Flag (B6) is set. If the Base storage area ID (A3) is not 0, i.e. the object belongs to the clone storage area 100', and the object manager checks if the clone object 102' exists by searching the Object Metadata (B) using B1=102, B2=100', and B3=100. If the clone object 102' exists, the PBN List (B5) is used to access the object's data. If the clone object 102' does not exist, then the object manager asks the clone manager to locate the correct metadata. The clone manager uses the Base Storage Area ID (A3) to locate the base storage area 100 and returns the information to the object manager. The object manager 24 uses the information to locate the metadata for the object as it would do for an object of a base storage area (see above). (As an alternate implementation, if the open request is for write, the clone manager duplicates the metadata, with the possible optimization of delaying this until the first write is performed.)

Figure 2C:
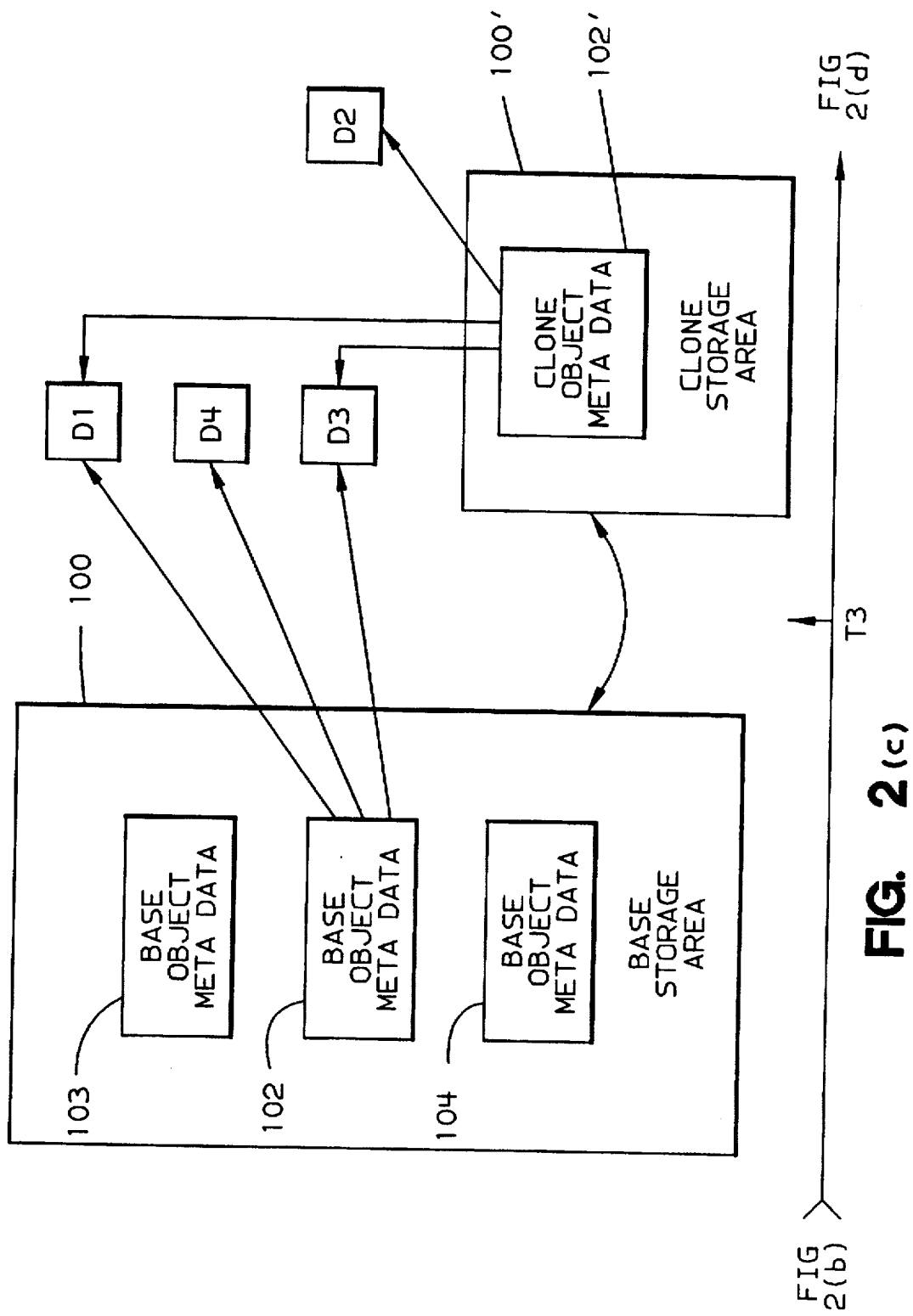
FIGS. 2(a-g) illustrate sequential results of processing by the computer system of FIG. 1 of various clone, open, read, write and close requests.

FIG. 2(c) illustrates the result of processing subsequent requests to open object 102 and update data block D2 of object 102. When object manager 24 receives the open (for write) request, the object manager 24 returns to the requester an object ID for object 102. When object manager 24 receives the request to update data block D2, then object manager 24 notifies clone manager 30 before complying with the request. In response, clone manager 30 reads the base storage area 100 information to compare the clone count of the object 102 (B4) to the clone count of the base storage area 100 (A4), and if less, knows that there are one or more outstanding clones, depending on the differential. However, it is possible that a previous version of data block D2 is already copied to a clone storage area as a result of a previous update. Thus, the clone manager 30 scans the CPT in the base storage area for the PBN of data block D2, and if data block D2 is in the CPT, then data block D2 is updated as if no clone existed for the base storage area. If the data block D2 is not in the CPT and there are outstanding clone(s), then the clone manager scans the storage area definitions to locate all clone storage areas which are associated with the base storage area 100 (i.e A3=100) where object 102 resides and were created after object 102 was created or last updated. In the illustrated example, such scanning identifies clone storage area 100'. Then, clone manager 30 copies the metadata for object 102 from the base storage area 100 to the clone storage area 100' (unless the clone storage area already contains this metadata due to a previous update request for object 102). The metadata for the other objects 103 and 104 is not copied into clone storage area 100'. Next, the clone manager 30 increments the clone count for the object 102 in the metadata in the base storage area 100. Because data block D2 will be changed into data block D4, and the clone storage area needs data block D2 without changes for clone object 102', metadata in the clone storage area 100' should include the PBNs of data blocks D1, D2 and D3; this metadata is copied from the metadata in the base storage area 100 before the update to object 102. At this moment, there is just one copy of data block D2. However, the object manager will need another copy of data block D2 in which to make the requested changes for the base storage area 100. Therefore, the clone manager 30 requests allocation of a new storage data block D4. Then, clone manager 30 updates the PBNs of the metadata of the base storage area 100 to substitute the PBN of the newly allocated data block D4 for the D2 data block. Data block D2 is copied into the new data block D4. Next, the clone manager 30 inserts the PBN of the newly allocated data block D4 into the CPT and updates data block D4 to complete the update. After this processing, clone file area 100' contains metadata for object 102' and this metadata identifies blocks D1, D2 and D3, and the base storage area 100 contains metadata for object 102 and this metadata identifies data blocks D1, D4 and D3. (The order of the blocks is significant in this example because D4 replaced D2.)

It is possible now for the same or different client to open the clone object 102' using a name that identifies the clone storage area instead of the base storage area. The object manager locates the clone storage area 100' and scans the object metadata for clone storage area 100' to locate object 102'. Unlike the illustrated example, if the clone storage area 100' does not contain the object 102' metadata then object 102 would be accessed via the object 102 metadata in the base storage area 100. However, if there is an outstanding clone 102' for object 102 in clone storage area 100' as illustrated, when the requester reads a portion of the data, the object manager 24 uses the PBN list (B5) in the object 102' metadata of the clone storage area 100' to provide the proper data blocks to the requester.

Figure 2D:
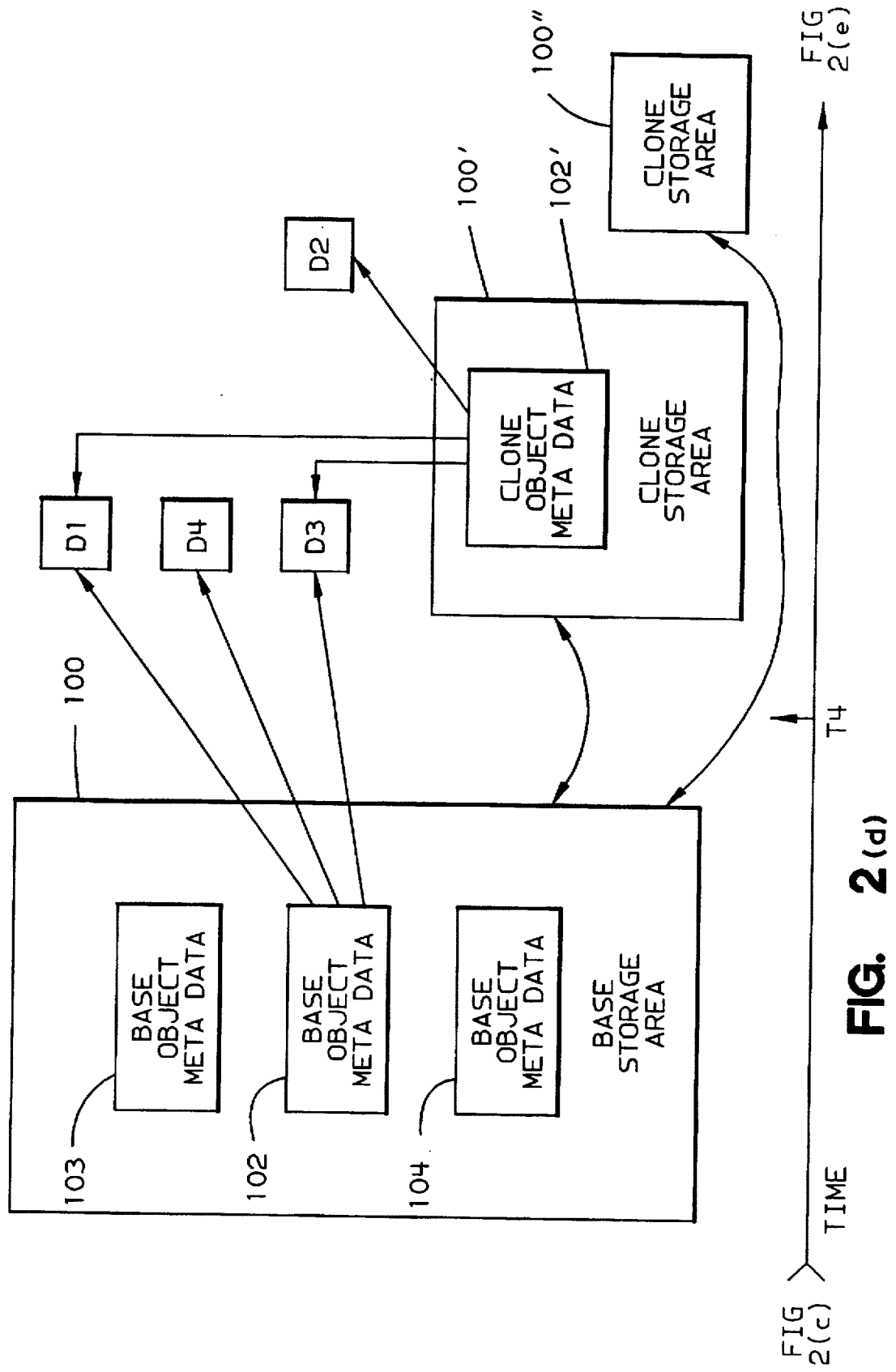

FIG. 2(d) illustrates the result of processing a client request to create another clone storage area 100" after the processing illustrated in FIGS. 2(a–c). Clone storage area 100" is created by allocating another storage area and copying the information of base storage area 100 except for the following. The clone count (A4) for the base storage area 100 is again incremented, whereas the clone count for the clone storage area 100" is zero. The date/time of creation (A6) of the clone storage area 100" is the current time, whereas the date/time of creation of the base storage area 100 is older. The Base Storage Area ID (A3) of the clone storage area 100" identifies the base storage area 100, i.e. is the same as the ID of the base Storage Area (A1). The Base Storage Area ID (A3) of the base storage area 100 is zero. (As a possible optimization, the identification of the clone storage area 100" is represented on a chain of clones for the base storage area to expedite identification of the clone storage area.) It should be noted that the object metadata is NOT copied into clone storage area 100" pursuant to this clone request. Additionally, all PBNs in the CPT table associated with base storage area 100 are removed from the CPT table because the PBNs are now associated with the clone storage area 100".

Figure 2E:
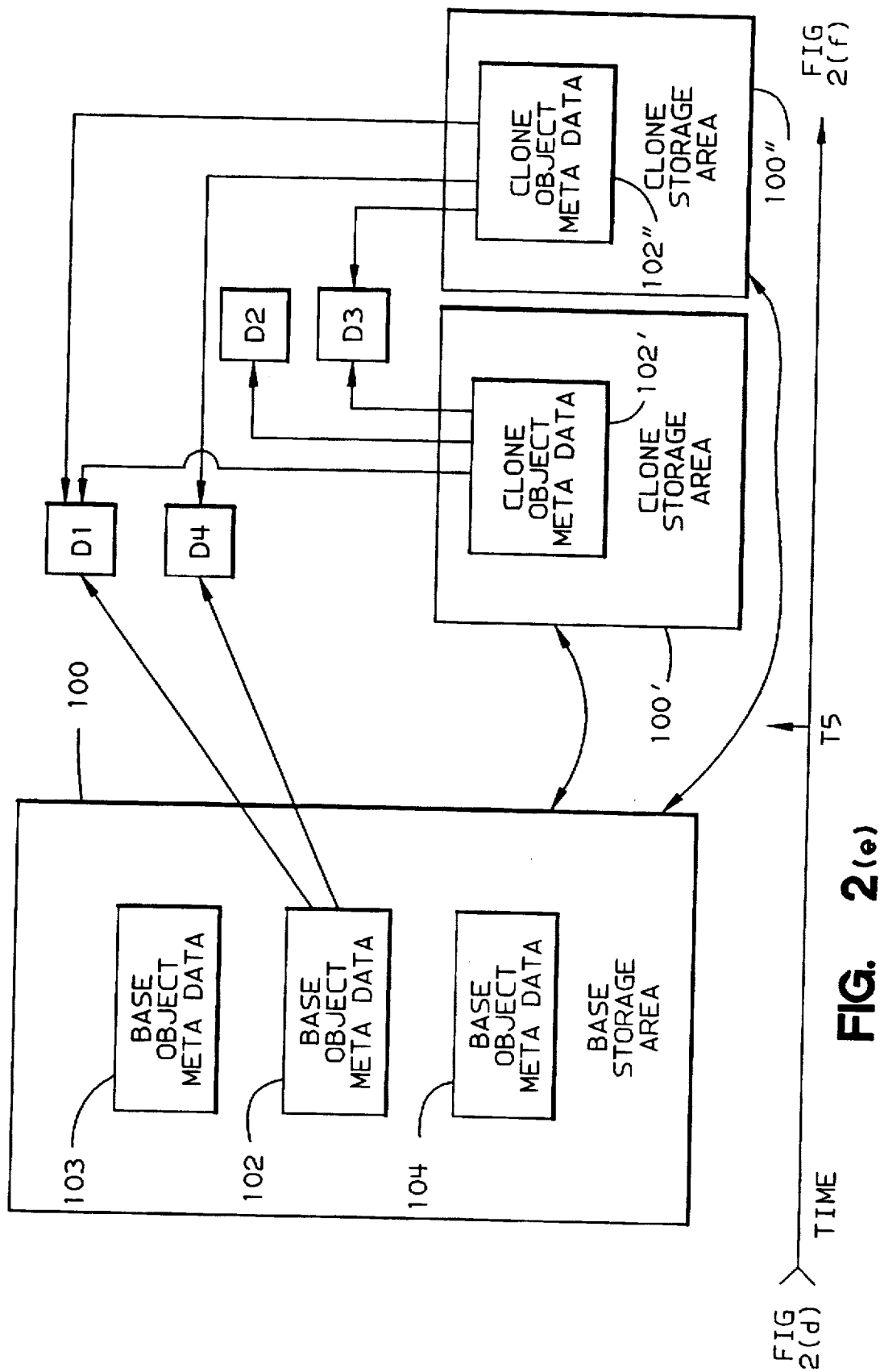

FIG. 2(e), illustrates the result of processing another client request to again update object 102 in the base file area 100. In the illustrated example, the current update request is to delete data block D3 altogether (i.e. truncate the file). Such a deletion is similar in principal to an update to a data block as described above and requires processing of clone storage area 100" also. Clone object 102" will mirror the state of object 102 in the base storage area illustrated in FIG. 2(c), i.e. when the second clone request was made, after data block D2 was replaced with data block D4, but before data block D3 is deleted. The metadata for the other objects is not copied into clone storage area 102". After the deletion of data block D3, the metadata of base storage area 100 indicates that object 102 comprises data blocks D1 and D4 whereas the metadata of clone storage area 100' indicates that object 102' comprises data blocks D1, D2 and D3 and the metadata of clone storage area 100" indicates that object 102" comprises data blocks D1, D4 and D3. Also, if the data block being deleted is in the CPT table, it is removed from the CPT table.

Figure 2F:
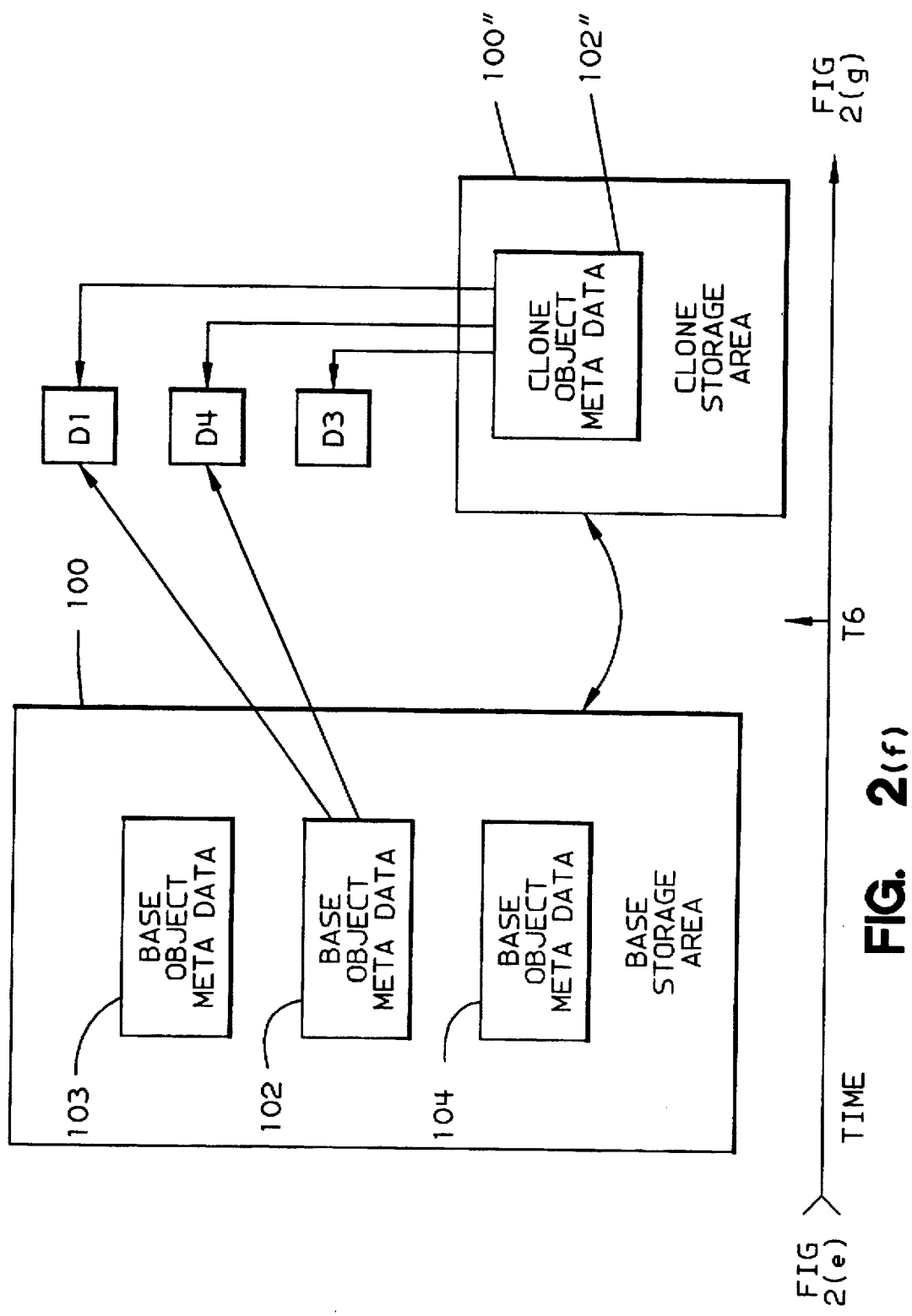

FIG. 2(f) illustrates the result of processing a subsequent request to delete the first clone storage area 100' (leaving the base storage area 100 and the second clone storage area 100"). First, the clone manager 30 identifies all objects in the clone storage area 100' from the metadata in clone storage area 100'. Then, for each object within the clone storage area 100', the clone manager finds the metadata for the same object in the base storage area 100, and decrements the Clone Count (B4) for the object's metadata in the base area. If this Clone Count (B4) in the base storage area goes to zero and an Erase Flag is on (as described below), then the clone manager deletes this object's metadata from the base storage area. If there are other clones of this object, then the clone manager makes a list of them, i.e. if the Clone Count (B4) for the object's metadata in the base storage area 100 is greater than zero, the clone manager finds all objects that have a Base storage area ID (B3) equal to the Storage Area ID (A1) of the base storage area. This list is used below in processing the PBNs. Next, the clone manager deletes all data blocks which will not be referenced by any area after the clone storage area 100' is deleted. Accordingly, for each data block in the PBN Lists of the objects of the clone storage area 100':

If the PBN is in the PBN List of the base storage area, this data block cannot be deleted.

If the PBN is not in the PBN List of the base storage area, but is in the PBN List of at least one of the other clones of the same base storage area, this data block cannot be deleted.

If the PBN is not in the PBN List of the base storage area and is not in the PBN List of any of the other clones of the same base storage area, then the clone manager deletes this data block.

After all the PBNs have been so processed for an object, the clone manager deletes the metadata for the object from the clone storage area 100'. After all the objects from the clone storage area have been so processed, then the clone manager 30 deletes/deallocates the clone storage area 100'. Next, the clone manager decrements the Clone Count (A4) in the area information of the base storage area 100. If the Clone Count for the base storage area then equals zero and the Erase Flag is on, then the clone manager deletes the base storage area also.

After this processing, the base storage area 100 and clone 100" remain. The base storage area encompasses object 102 which includes data blocks D1 and D4 (and objects 103 and 104), and clone storage area 100" encompasses object 102" which includes data blocks D1, D4 and D3. However, none of the remaining base or clone storage areas references data block D2, so there is no longer any copy of data block D2 or the metadata for data block D2.

Figure 2G:
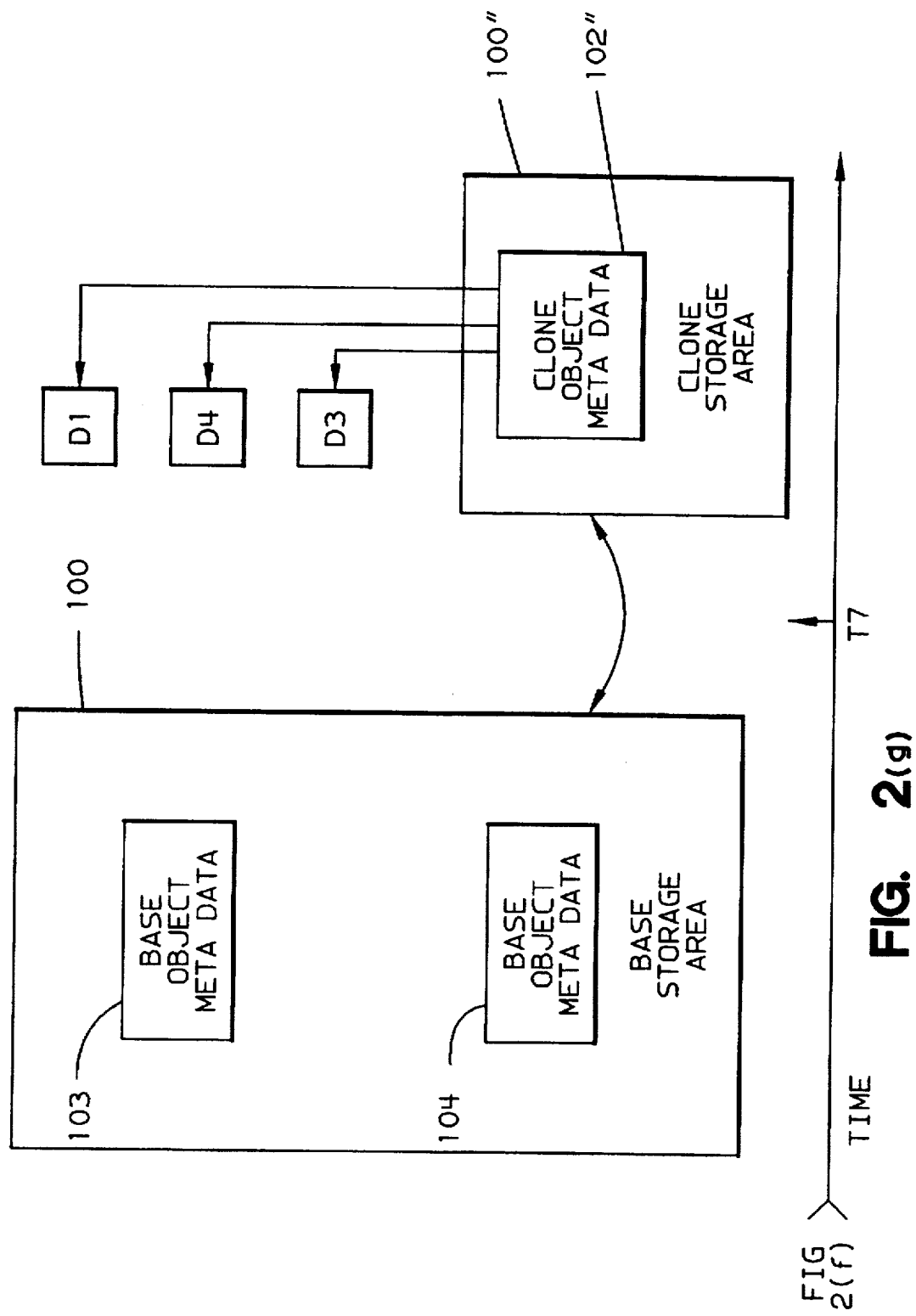

FIG. 2(g) illustrates the result of processing another subsequent client request to delete object 102 altogether, after the requests illustrated in FIGS. 2(a–f). If the Clone Count (B4) of the object 102 metadata in the base storage area is less than the Clone Count (A4) in the metadata of the base storage area 100.

The clone manager creates a list of all clones that were created after the object 102 was created. (Any cloned areas that were created prior to the creation of the object would not reflect the object anyway.)

The clone manager reviews each cloned area in the above list and copies the base storage area 100 metadata for object 102 to the clone storage area 100' (unless the metadata already exists there). For each cloned copy where the metadata is copied, the Clone Count (B4) in the base object metadata 102 is incremented.

The clone scans the CPT of the base storage area 100 for PBNs that match the PBNs in the object sought to be erased. For each matching PBN, the entry is removed from the CPT table. If no new objects were created as a result of the previous step, the clone manager de-allocates the the actual data block. (Otherwise, the block may be needed by one or more of the newly created clones.)

Next, the clone manager sets the Erase Flag (B6) in the base storage area 100 metadata for object 102. If the Clone Count (B4) is zero, then the object 102 is erased.

As illustrated in FIG. 2(g), the metadata for object 102 has been deleted from the base storage area 100, and there was no change to clone storage area 100".

Based on the foregoing, a computer system including a clone manager according to the present invention has been disclosed. However, numerous modifications and substitutions can be made without deviating from the scope of the present invention. For example, a CPT can be written to non-volatile storage to allow for full reconstruction of the state of the system in the event of a computer system failure. Therefore, the present invention has been disclosed by way of illustration and not limitation and reference should be made to the following claims to determine the scope of the present invention.

We claim:

1. A method for managing objects in a computer system, said method comprising the steps of:

receiving a request to clone a base storage area, said base storage area containing metadata for each of multiple objects, said metadata for each object identifying data within said each object;

in response to said request, creating a clone storage area containing an identification of said base storage area but not containing said metadata; and if there is a subsequent request to update a portion of one of said objects, then determining that said clone storage area exists and consequently copying said portion, copying said metadata into said clone storage area for said one object, making said update to the portion copy and changing said metadata in said base storage area to identify said portion copy instead of said portion.

if there is no subsequent request to update any of said multiplicity of objects, then not copying the metadata for any of said multiplicity of objects into said clone storage area.

2. A method as set forth in claim 1 further comprising the step of incrementing a clone storage area count field in said base storage area pursuant to said request to clone said base storage area and wherein the step of determining that said clone storage area exists comprises the step of reading said clone storage area count field.

3. A method as set forth in claim 1 wherein there is said request to update said portion of said one object, and further comprising the steps of:

receiving a subsequent request to delete said one object, and in response, deleting the updated portion copy and deleting the metadata for said object from said base storage area but maintaining said one object without said updated portion copy and the metadata in said clone storage area for said one object without said update portion copy.

4. A method as set forth in claim 1 wherein said objects are files and said base storage area is a file set or file space.

5. A method as set forth in claim 4 wherein said files comprise metadata and data.

6. A method as set forth in claim 1 wherein said objects comprise metadata.

7. A method as set forth in claim 1 wherein there is said subsequent request, and said metadata for the other objects is not copied to said clone storage area.

8. A method as set forth in claim 1 further comprising the subsequent steps of receiving another request to clone said base storage area, and in response, creating another clone storage area containing an identification of said base storage area but not containing said metadata for any of the multiple objects.

9. A method as set forth in claim 2 further comprising the step of receiving a request to delete said clone storage area, and in response, decrementing said clone storage area count field in said base storage area, deleting said portion without said update and deleting said metadata in said clone storage area and said identification in said clone storage area.

10. A method for managing objects, said method comprising the steps of:

receiving a request to clone a base storage area, said base storage area containing metadata for each of multiple objects, said metadata for each object identifying data within said each object;

in response to said request, creating a clone storage area containing an identification of said base storage area but not containing said metadata, and if there is a subsequent request to update a portion of one of said objects, then copying said portion, copying said metadata into said clone storage area for said one object, making said update to the portion copy and changing said metadata in said base storage area to identify said portion copy instead of said portion, if there is no subsequent request to update any of said multiplicity of objects, then not copying the metadata for any of said multiplicity of objects into said clone storage area; and receiving another request to clone said base storage area, and in response, creating another clone storage area containing an identification of said base storage area but not containing said metadata, and wherein there is said request to update said one object, and if there is another, subsequent request to update a portion of another of said objects, then copying said other object portion, copying the metadata from said base storage area into said other clone storage area for said other object, making the requested update to said other object portion copy and changing said metadata in said base storage area to identify said other object portion copy, if there is no other subsequent request to update any of said multiplicity of objects, then not copying said metadata for any of said multiplicity of objects into said other clone storage area.

11. A method as set forth in claim 10 wherein there is said request to update said other object and further comprising the subsequent step of:

receiving a request to delete the first said clone storage area, and in response, deleting said first clone storage area and said one object without the respective update.

12. A method for managing objects, said method comprising the steps of:

receiving a request to clone a base storage area, said base storage area containing metadata for each of multiple objects, said metadata for each object identifying data within said each object;

in response to said request, creating a clone storage area containing an identification of said base storage area but not containing said metadata; and if there is a subsequent request to update a portion of one of said objects, then copying said portion copying said metadata into said clone storage area for said one object, making said update to the portion copy and changing said metadata in said base storage area to identify said portion copy instead of said portion, if there is no subsequent request to update any of said multiplicity of objects, then not copying the metadata for any of said multiplicity of objects into said clone storage area, receiving another request to clone said base storage area, and in response, creating another clone storage area containing an identification of said base storage area but not containing said metadata, and wherein both the first said clone storage area and said other clone storage area are maintained after said other clone storage area is created.

13. A computer system for managing objects, said system comprising:

means for receiving a request to clone a base storage area, said base storage area containing metadata for each of multiple objects, said metadata for each object identifying data within said each object; and means, responsive to said request, for creating a clone storage area containing an identification of said base storage area but not containing said metadata, and if there is a subsequent request to update a portion of one of said objects, then determining that said clone storage area exists and consequently copying said portion, copying said metadata into said clone storage area for said one object, making said update to the portion copy and changing said metadata in said base storage area to identify said portion copy instead of said portion, if there is no subsequent request to update any of said multiplicity of objects, then not copying the metadata for any of said multiplicity of objects into said clone storage area.

14. A computer program product for managing objects, said computer program product comprising:

a computer readable medium;

first program instruction means for instructing a processor to receive a request to clone a base storage area, said base storage area containing metadata for each of multiple objects, said metadata for each object identifying data within said each object; and second program instruction means, responsive to said request, for instructing a processor to create a clone storage area containing an identification of said base storage area but not containing said metadata, and if there is a subsequent request to update a portion of one of said objects, to determine that said clone storage area exists and consequently copy said portion, copy said metadata into said clone storage area for said one object, make said update to the portion copy and change said metadata in said base storage area to identify said portion copy instead of said portion, if there is no subsequent request to update any of said multiplicity of objects, then not to copy the metadata for any of said multiplicity of objects into said clone storage area; and wherein each of said program instruction means is recorded on said medium.

15. A method for managing objects in a computer system, said method comprising the steps of:

receiving a request to clone a base storage area, said base storage area containing metadata for each of multiple objects, said metadata for each object identifying data within said each object;

in response to said request, creating a clone storage area containing an identification of said base storage area but not containing said metadata;

receiving a subsequent request to update a portion of one of said objects, and in response, copying said portion, copying said metadata into said clone storage area for said one object, making said update to the portion copy and changing said metadata in said base storage area to identify said portion copy instead of said portion;

receiving another request to clone said base storage area, and in response, creating another clone storage area containing an identification of said base storage area but not containing said metadata; and receiving another, subsequent request to update a portion of another of said objects, and in response, copying said portion of said other object, copying the metadata from said base storage area into said other clone storage area for said other object, making the requested update to said portion copy of said other object and changing said metadata in said base storage area to identify said portion copy of said other object.

16. A method for managing objects in a computer system, said method comprising the steps of:

receiving a request to clone a base storage area, said base storage area containing metadata for each of multiple objects, said metadata for each object identifying data within said each object;

in response to said request, creating a clone storage area containing an identification of said base storage area but not containing said metadata;

receiving a subsequent request to update a portion of one of said objects, and in response, copying said portion, copying said metadata into said clone storage area for said one object, making said update to the portion copy and changing said metadata in said base storage area to identify said portion copy instead of said portion;

receiving another request to clone said base storage area, and in response, creating another clone storage area containing an identification of said base storage area but not containing said metadata; and wherein both the first said clone storage area and said other clone storage area are maintained after said other clone storage area is created.

* * * * *